(12) United States Patent
Stegemann et al.

(10) Patent No.: US 8,104,631 B2
(45) Date of Patent: Jan. 31, 2012

(54) PORTABLE CRANE SYSTEM FOR WIND TURBINE COMPONENTS

(75) Inventors: Klaus Stegemann, Coesfeld (DE);
Bernhard Meyering, Emsburen (DE);
Suvashis Mukherjee, Amstelveen (NL)

(73) Assignee: General Electric Company, Schenectady, NY (US)

(*) Notice: Subject to any disclaimer, the term of this patent is extended or adjusted under 35 U.S.C. 154(b) by 51 days.

(21) Appl. No.: 12/256,499

(22) Filed: Oct. 23, 2008

(65) Prior Publication Data
US 2010/0021278 A1 Jan. 28, 2010

Related U.S. Application Data

(60) Provisional application No. 61/083,485, filed on Jul. 24, 2008.

(51) Int. Cl.
*B66C 23/18* (2006.01)
(52) U.S. Cl. ........................................................ 212/179
(58) Field of Classification Search .................. 212/179
See application file for complete search history.

(56) References Cited

U.S. PATENT DOCUMENTS

| | | | | |
|---|---|---|---|---|
| 4,112,863 A | * | 9/1978 | Nelson | 114/264 |
| 4,700,851 A | * | 10/1987 | Reeve et al. | 212/181 |
| 5,211,526 A | * | 5/1993 | Robinette | 414/550 |
| 6,095,349 A | | 8/2000 | O'Meara | |
| 6,516,737 B2 | * | 2/2003 | Le Coz et al. | 114/72 |
| 6,619,918 B1 | | 9/2003 | Rebsdorf | |
| 6,652,221 B1 | * | 11/2003 | Praenkel | 415/3.1 |
| 6,840,734 B2 | | 1/2005 | Hansen | |
| 7,023,105 B2 | | 4/2006 | Wobben | |
| 7,101,152 B2 | | 9/2006 | Wobben | |
| 2006/0054580 A1 | * | 3/2006 | Sherrod | 212/180 |
| 2006/0273595 A1 | | 12/2006 | Avagliano et al. | |
| 2007/0018457 A1 | | 1/2007 | Liorente Gonzalez | |

FOREIGN PATENT DOCUMENTS

| | | | |
|---|---|---|---|
| EP | 1101934 A2 | * | 5/2001 |
| EP | 1291521 A1 | * | 3/2003 |
| EP | 1677007 A2 | * | 7/2006 |
| JP | 2005201128 A | * | 7/2005 |
| NL | 1014553 C2 | | 9/2001 |
| WO | WO 02/34664 A1 | * | 5/2002 |
| WO | 2008069818 A | | 6/2008 |

* cited by examiner

*Primary Examiner* — Michael Mansen
*Assistant Examiner* — Juan Campos, Jr.
(74) *Attorney, Agent, or Firm* — McNees Wallace & Nurick LLC

(57) ABSTRACT

A portable crane assembly for servicing a wind turbine. The crane assembly includes a first primary support member and a second primary support member being rotatably attached to one another. The first primary support member is configured to attach to a wind turbine component. The second primary support is coaxially rotatable with respect to the first primary support member. The crane assembly further includes a boom member pivotably attached to an end of the second primary support member. The portable crane assembly is disassemblable into components that can be manually carried. A wind turbine servicing system and a method for servicing a wind turbine are also disclosed.

8 Claims, 14 Drawing Sheets

PORTABLE CRANE SYSTEM FOR WIND TURBINE COMPONENTS

CROSS REFERENCE TO RELATED PATENT APPLICATIONS

This application claims the benefit of U.S. Provisional Application No. 61/083,485, filed Jul. 24, 2008, which Application is hereby incorporated by reference in its entirety.

FIELD OF THE INVENTION

The present disclosure is directed to crane assemblies and methods for servicing and installing wind turbines and components thereof.

BACKGROUND

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in length). In addition, the wind turbines are typically mounted on towers that are at least 60 meters in height. Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid. In order to provide the efficient conversion of mechanical energy to electrical energy, the wind turbine utilizes a variety of wind turbine components that are too heavy and/or awkward to manually carry, such as shafts, gearing components, pitch drives, generator components and other components within the wind turbine.

Components in the wind turbine typically have to be installed, serviced or replaced using mobile land-based cranes and/or manually carrying components to remove and/or replace components. Wind turbine components may be huge or awkward to handle, precluding manual transportation of the components. Further, wind turbines may be installed on uneven terrain and/or on very high towers (e.g., towers that are at least 60 meters in height) that are inaccessible to mobile land-based cranes. In addition, operation of mobile land-based cranes is expensive.

Therefore, what is needed is an inexpensive method and apparatus for installing, servicing or replacing components in wind turbines that is portable, lightweight and/or is capable of operation at the operating heights of wind turbines and in the various terrains in which wind turbines may be installed.

SUMMARY

One aspect of the present disclosure includes a portable crane assembly for servicing a wind turbine. The crane assembly includes a first primary support member and a second primary support member being rotatably attached to one another. The first primary support member is configured to attach to a wind turbine component. The second primary support is coaxially rotatable with respect to the first primary support member. The crane assembly further includes a boom member pivotably attached to an end of the second primary support member. The portable crane assembly is disassemblable into components that can be manually carried.

Another aspect of the present disclosure includes a wind turbine servicing system having a first crane assembly and a second crane assembly arranged and disposed on a wind turbine. The first crane assembly includes a first primary support member and a second primary support member being rotatably attached to one another. The first primary support member is configured to attach to a wind turbine component. The second primary support is coaxially rotatable with respect to the first primary support member. The crane assembly further includes a boom member pivotably attached to an end of the second primary support member. The first and second crane assemblies are disassemblable into components that can be manually carried. The second crane assembly is arranged and disposed to permit manipulation of components within the wind turbine.

Still another aspect of the present disclosure is a method for servicing a wind turbing. The method includes assembling a first crane assembly on a wind turbine. The first crane assembly includes a first primary support member and a second primary support member being rotatably attached to one another. The first primary support member is configured to attach to a wind turbine component. The second primary support is coaxially rotatable with respect to the first primary support member. The crane assembly further includes a boom member pivotably attached to an end of the second primary support member. The first crane assembly is disassemblable into components that can be manually carried. A service load is lifted from the ground with the first crane assembly and providing the component to a hatch of the wind turbine. The service load is then positioned in a desired position.

An advantage of an embodiment of the present disclosure is that wind turbine components may be transported to and from a wind turbine safely and easily.

Another advantage of an embodiment of the present disclosure is the crane assembly is portable and may disassemble into components easily carried by installers and/or servicers.

Another advantage of an embodiment of the present disclosure is that the components may be transported to and from the wind turbine, even when the wind turbine is installed on rugged terrain or when installed offshore.

Another advantage of an embodiment of the present disclosure is the crane assembly is easily assembled onto existing wind turbines with few, if any, modifications required of current wind turbines.

Still another advantage of an embodiment of the present disclosure is that the lift and drop operation may be accomplished without requirement of full exposure of service personnel on top of nacelle hatch, which provides increase personnel safety.

Still another advantage of an embodiment of the present disclosure is that heavy and/or larger service tools may be brought up to the nacelle by easily attaching a lifting basket or other structure to the winch/lifting rope.

Other features and advantages of the present disclosure will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION

The present disclosure now will be described more fully hereinafter with reference to the accompanying drawings, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

The present disclosure is related to a portable wind turbine servicing system including at least one crane assembly for use with a wind turbine that is easily assembled, portable, disassembles into lightweight easily transported components, and is capable of transporting various wind turbine components both to and from the wind turbine. As utilized herein, the "load" and "service load" include any component, device, or other load that may be lifted by the system of the present disclosure. As utilized herein, the "ground", from which service loads may be lifted or dropped, is not limited to dry ground and may include any surface or water condition onto which the wind turbine may be mounted. For example, the ground may be terrain, water (e.g. ocean or lake surface) or any other location onto which a wind turbine may be installed. Embodiments according to the disclosure can be adapted to cranes for multi megawatt turbines of rating 2.5 MW and higher on land and/or offshore installations.

Figure 1:
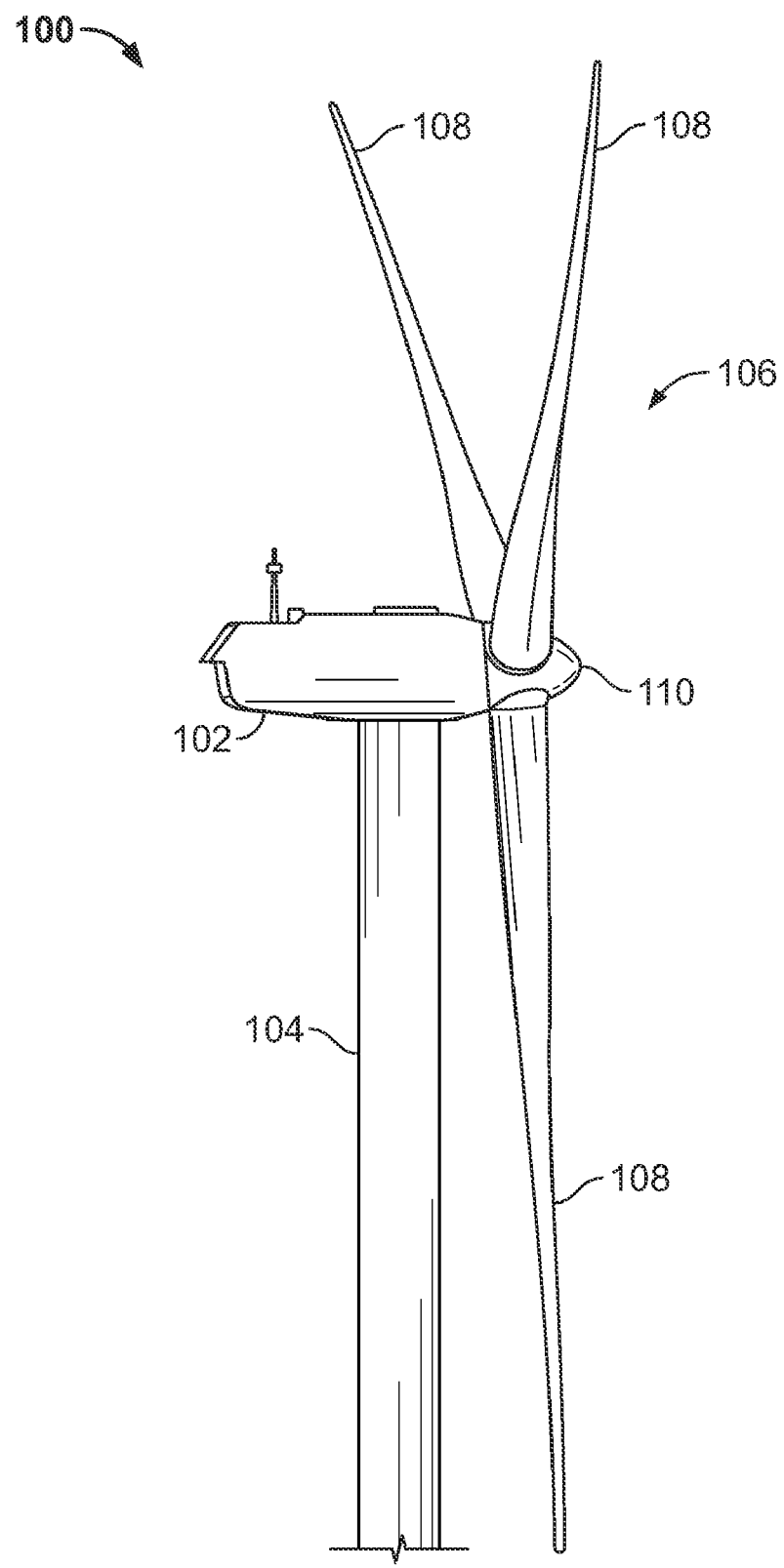
FIG. 1 is a drawing of an exemplary configuration of a wind turbine.

As shown in FIG. 1, a wind turbine 100 generally comprises a nacelle 102 housing a generator (not shown in FIG. 1). Nacelle 102 is a housing mounted atop a tower 104, only a portion of which is shown in FIG. 1. The height of tower 104 is selected based upon factors and conditions known in the art, and may extend to heights up to 60 meters or more. The wind turbine 100 may be installed on any terrain providing access to areas having desirable wind conditions. The terrain may vary greatly and may include, but is not limited to, mountainous terrain or offshore locations. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present disclosure.

Figure 2:
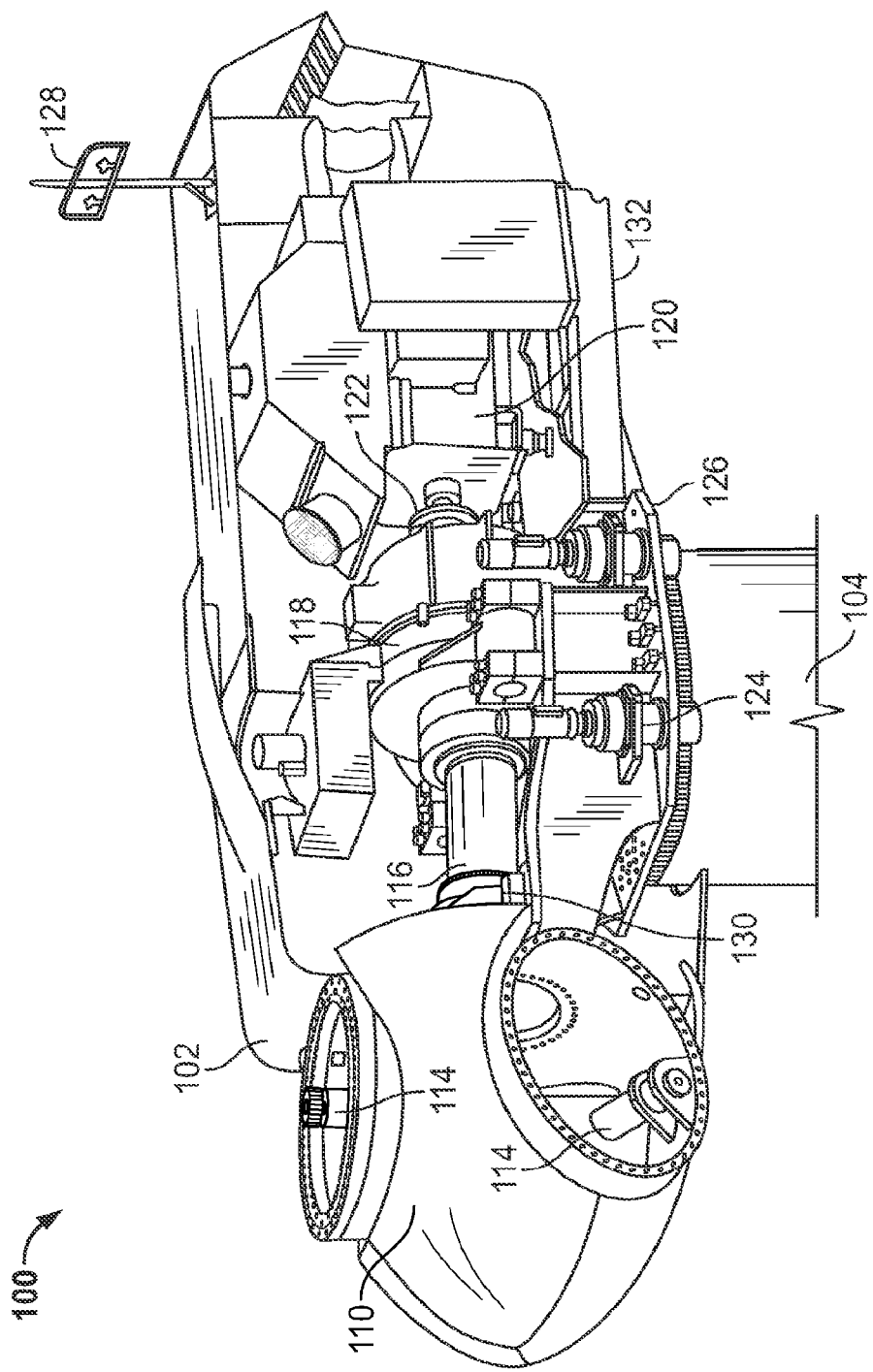
FIG. 2 is a cut-away perspective view of a nacelle of an exemplary wind turbine configuration.

As shown in FIG. 2, various components are housed in nacelle 102 atop tower 104 of wind turbine 100. For example, a variable blade pitch drive 114 may control the pitch of blades 108 (not shown in FIG. 2) that drive hub 110 as a result of wind. Hub 110 may be configured to receive three blades 108, but other configurations may utilize any number of blades. In some configurations, the pitches of blades 108 are individually controlled by blade pitch drive 114. Hub 110 and blades 108 together comprise wind turbine rotor 106.

The drive train of the wind turbine 100 includes a main rotor shaft 116 (also referred to as a "low speed shaft") connected to hub 110 via main bearing 130 and (in some configurations), at an opposite end of shaft 116 to a gear box 118. Gear box 118, in some configurations, utilizes a dual path geometry to drive an enclosed high-speed shaft. In other configurations, main rotor shaft 116 is coupled directly to generator 120. The high-speed shaft (not shown in FIG. 2) is used to drive generator 120, which is mounted on mainframe 132. In some configurations, rotor torque is transmitted via coupling 122. Generator 120 may be of any suitable type, for example and without limitation, a wound rotor induction generator or a direct drive permanent magnet generator. Yaw drive 124 and yaw deck 126 provide a yaw orientation system for wind turbine 100 to rotate the wind turbine to a position that faces the wind. Meteorological boom 128 provides information for a turbine control system, including wind direction and/or wind speed. In some configurations, the yaw system is mounted on a flange provided atop tower 104.

The individual components within nacelle 102, as discussed above, may require servicing and/or replacement from time to time, either as a part of a regular maintenance schedule or due to malfunction or damage. The present disclosure includes installing a crane assembly 300 extending through hatch 331 to install/remove and lower/raise components from the ground to the wind turbine 100.

Figure 3:
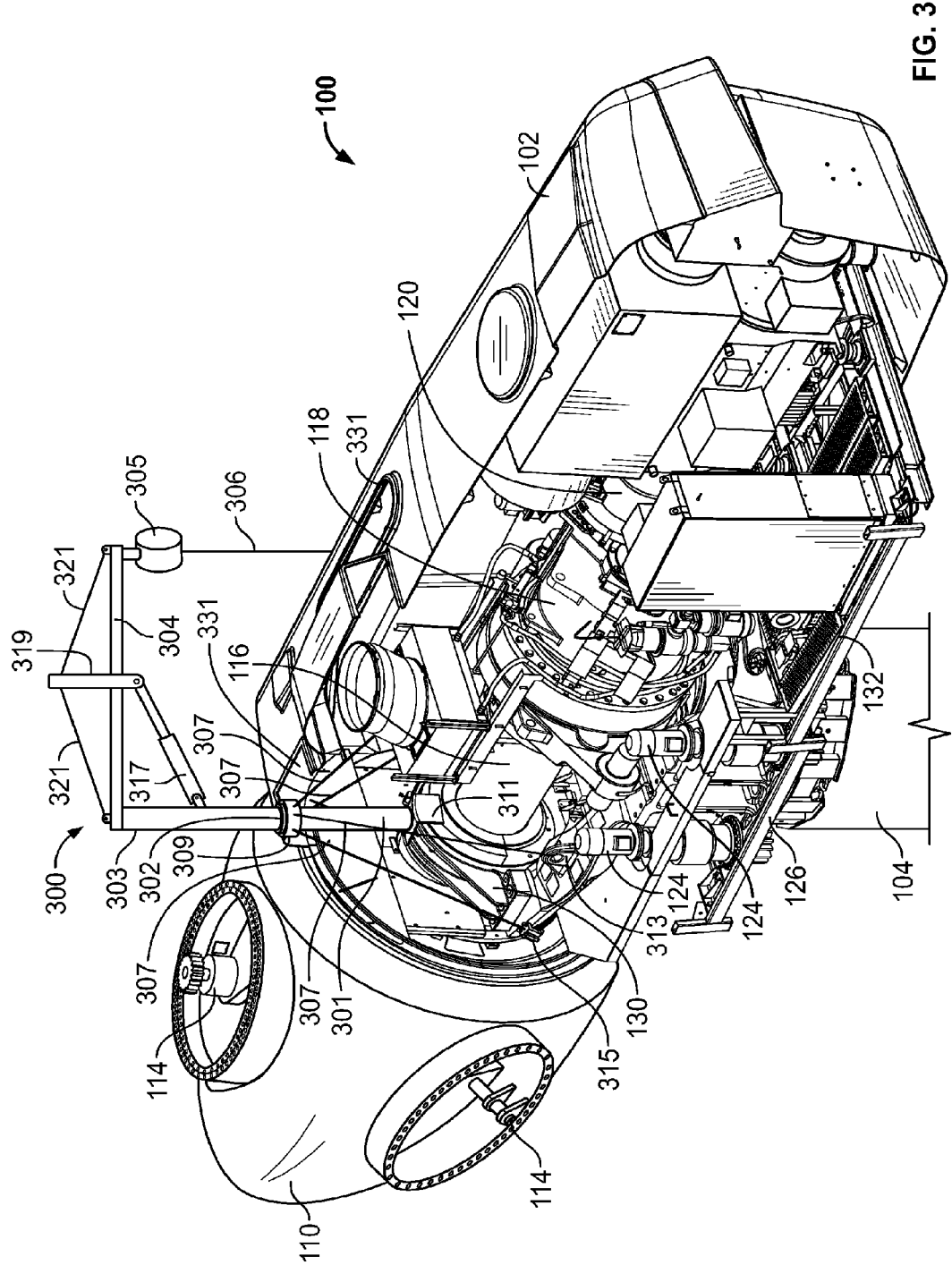
FIG. 3 is a cut-away perspective view of a nacelle of another exemplary wind turbine configuration having a crane assembly installed.
Figure 4:
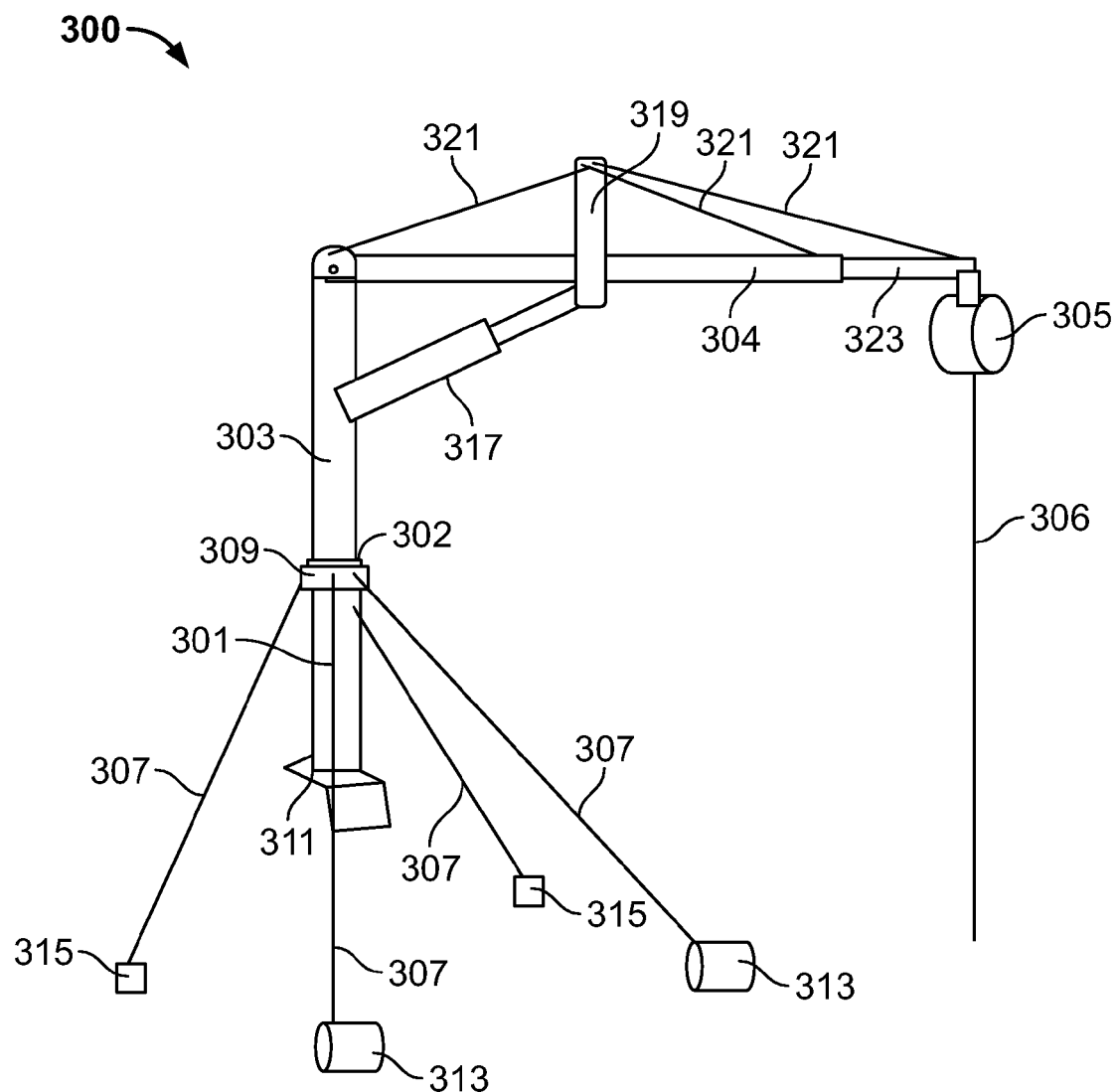
FIG. 4 is a perspective view of a crane assembly according to an embodiment of the present disclosure.
Figure 10:
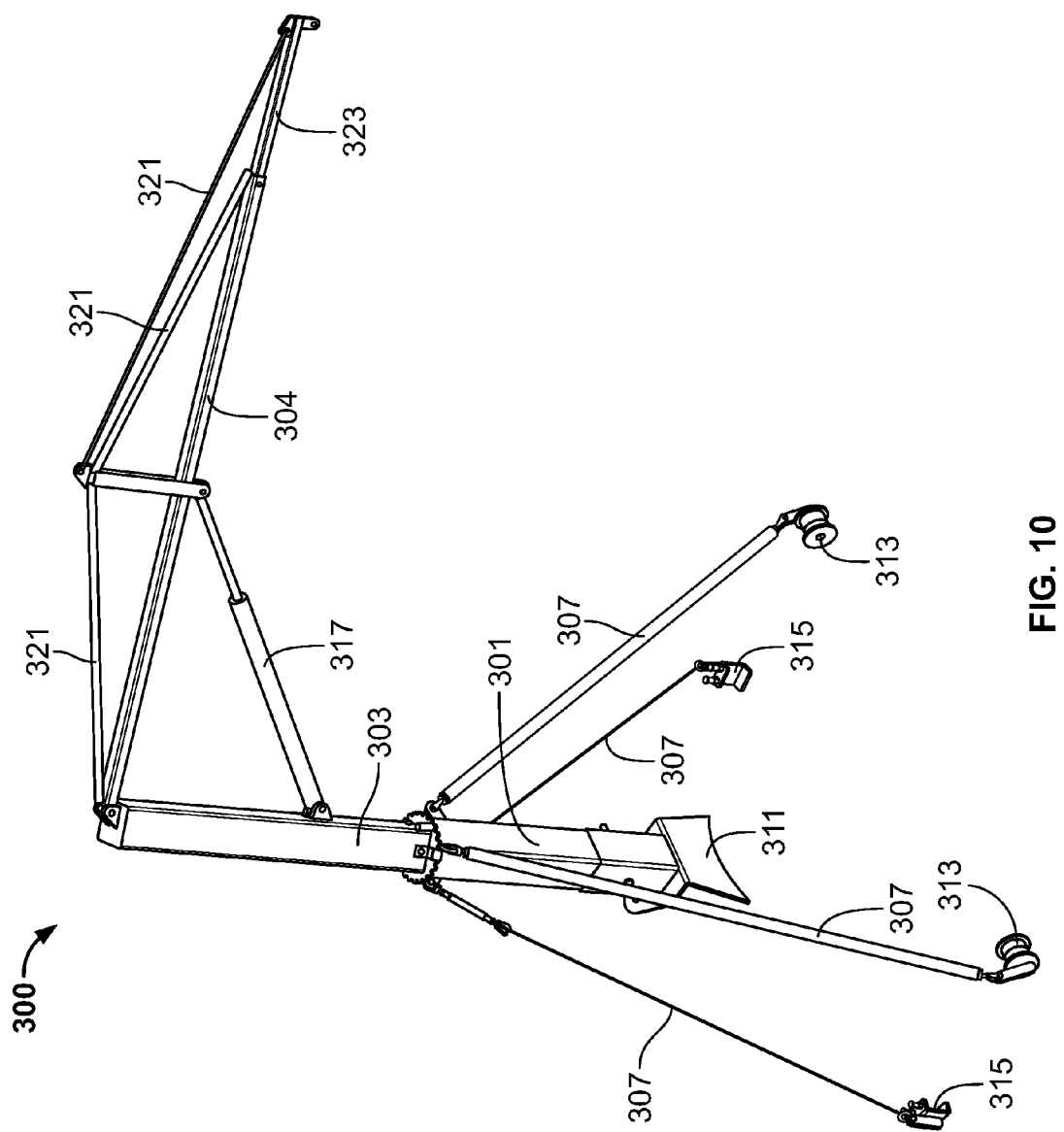
FIG. 10 is a perspective view of a crane assembly according to an embodiment of the present disclosure.

FIG. 3 shows a cutaway view of a wind turbine 100 with a first crane assembly 300 according to an embodiment of the present disclosure installed. As also shown in FIGS. 4 and 10, the first crane assembly 300 includes a first primary support member 301 and a second primary support member 303 rotatably attached to each other. The first crane assembly 300 further includes a boom member 304 pivotably attached to the second primary support member 303. The first primary support member 301 and the second primary support member 301 are attached such that the second primary support member 303 is permitted to coaxially rotate with respect to the first primary support member 301. The rotation may be facilitated by any suitable junction 302, including, but not limited to frictional interfaces, bearing arrangements or other structures that permit rotation. The first crane assembly 300 extends though hatch 331 and provides lifting of components to/from other hatches 331 in the nacelle 102.

The first primary support member 301 is attached to the wind turbine by attachment plate 311. Attachment plate 311 is configured to mate, attach or otherwise fasten to a component of the wind turbine 100. While not so limited, the attachment plate 311 may attach to or replace existing components, and utilize existing fastening locations. In one embodiment, the attachment plate 311 may be attached to existing footplates of main bearing 130.

The first and second primary support members 301, 303 are additionally supported by secondary support members 307. The secondary support members 307 may be a bar, wire, cable, rope, chain, strap or any other elongated device capable of supporting the first and second primary support members 301, 303. Secondary support members 307 are affixed to the first primary support member 301 by collar 309. Collar 309 attaches to first primary support member 301 and support member 307 in any suitable manner and provides support. The support member 307 attaches to wind turbine 100 by secondary support fasteners 313 and secondary support clamps 315. While not so limited, the secondary support fasteners 313 may fasten to existing lifting eyes 513 (see e.g. FIG. 5) of the wind turbine 100. In addition, secondary support clamps 315 may be clamped or otherwise fastened to lips, features or surfaces within the wind turbine 100 that provide a desired angle providing support for the first and second primary support members 301, 303. The secondary support members 307 are preferably configured at an angle and connected to the first and second primary support members 301, 303 such that sufficient support is provided that wind turbine components of significant weight may be lifted by the lift member 305. In one embodiment, the secondary support members 307 are configured to provide sufficient support for first and second primary support members 301, 303 to lift components from wind turbine 100 to and/or from the surface.

Boom member 304 is pivotably attached to an end of the second primary support member 303. A boom actuator 317 is attached to second primary support member 303 and boom member 304. Boom actuator 317 may include a hydraulic drive or piston, electrically driven actuator or other device capable of pivoting boom member 304 to desired angles with respect to the first and second primary support members 301, 303. The boom actuator 317 is attached to boom member 304 by boom support 319. However, the disclosure is not so limited and may include other arrangements, including direct attachment of the boom actuator 317 to the boom member 304.

Boom member 304 is additionally support by secondary boom supports 321. The secondary boom supports 321 may be a bar, wire, cable, rope, chain, strap or any other elongated device capable of supporting the boom member 304. Boom member extension 323 extends from boom member 304 and provides additional length for lifting. Like boom member 304, the boom member extension 323 is support by secondary boom supports 321. The boom member extension 323 may be actuatable by any suitable method, including by electric or hydraulic drives or by hand. In one embodiment, the boom member extension 323 may be actuated by hand and retained in position by a pin or other fastener.

A lift member 305 is disposed at an end of boom member 304. The lift member 305 may include a winch, lift, chain drive or any other lifting mechanism that is capable of being supported by boom member 304 and lifting wind turbine components. Line 306 extends from lift member 305 and is attachable to turbine components that require lifting. Line 306 may be a wire, cable, rope, chain or any other elongated device for lifting. In addition, the lift member 305 provides a length of line 306 sufficiently long to lower wind turbine components to the ground from above hub 110 of the wind turbine 100. The position of lift member 305 is not limited to the end of boom member 304 and may be disposed in any location that permits lifting of components. For example, lift member 305 may be mounted on second primary support member 303 and line 306 may be guided by pulleys or other structures to the end of boom member 304. In other embodiments, the lift member 305 may utilize auxiliary components, such as spring loaded coiling drums or similar devices for line management and deployment. First crane assembly 300 provides 360° rotation about the axis passing through the first and second primary support members 301, 303.

Figure 5:
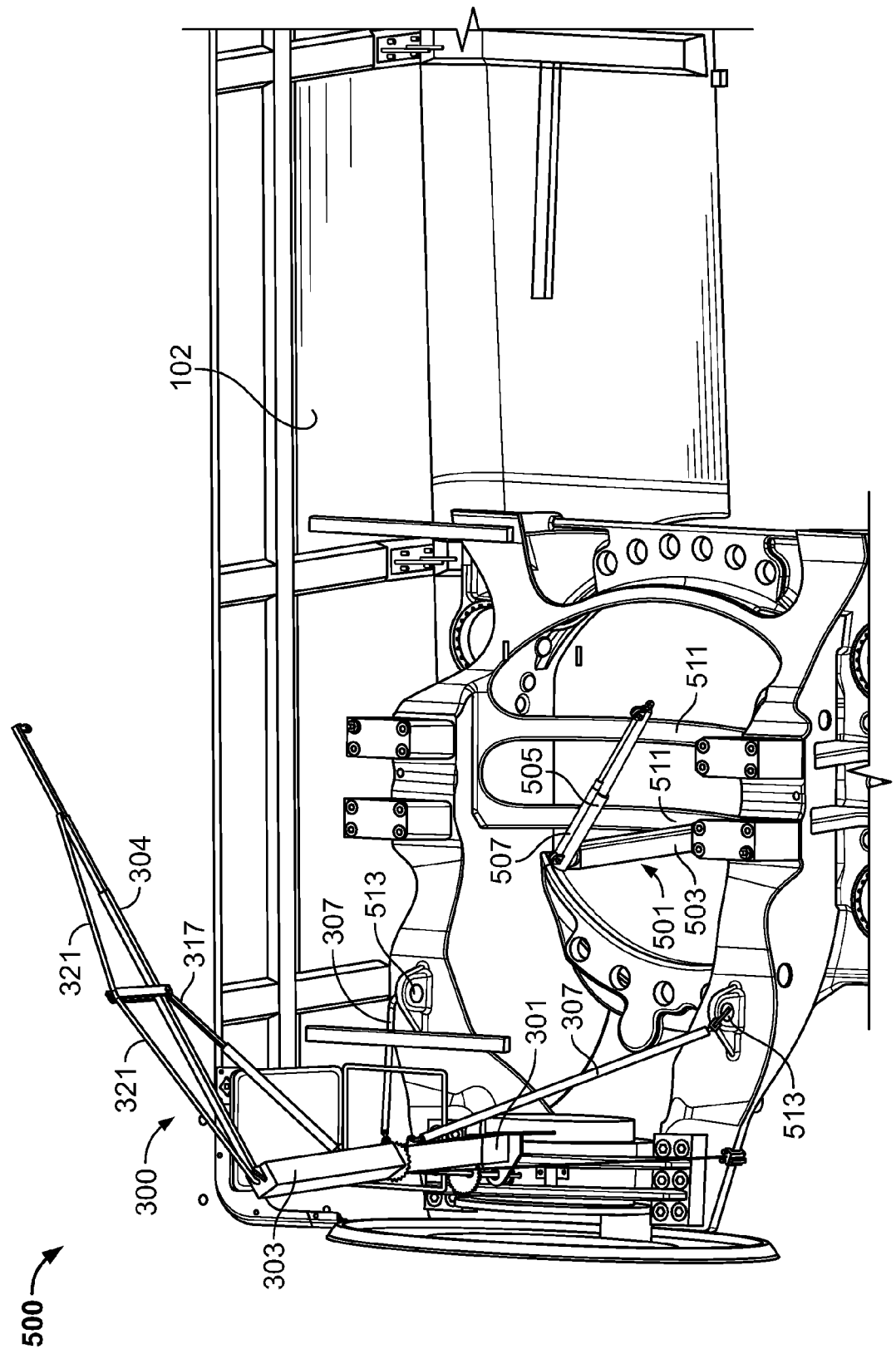
FIG. 5 is a cut-away perspective view of a nacelle of another exemplary wind turbine configuration having a first crane assembly and second crane assembly installed.
Figure 6:
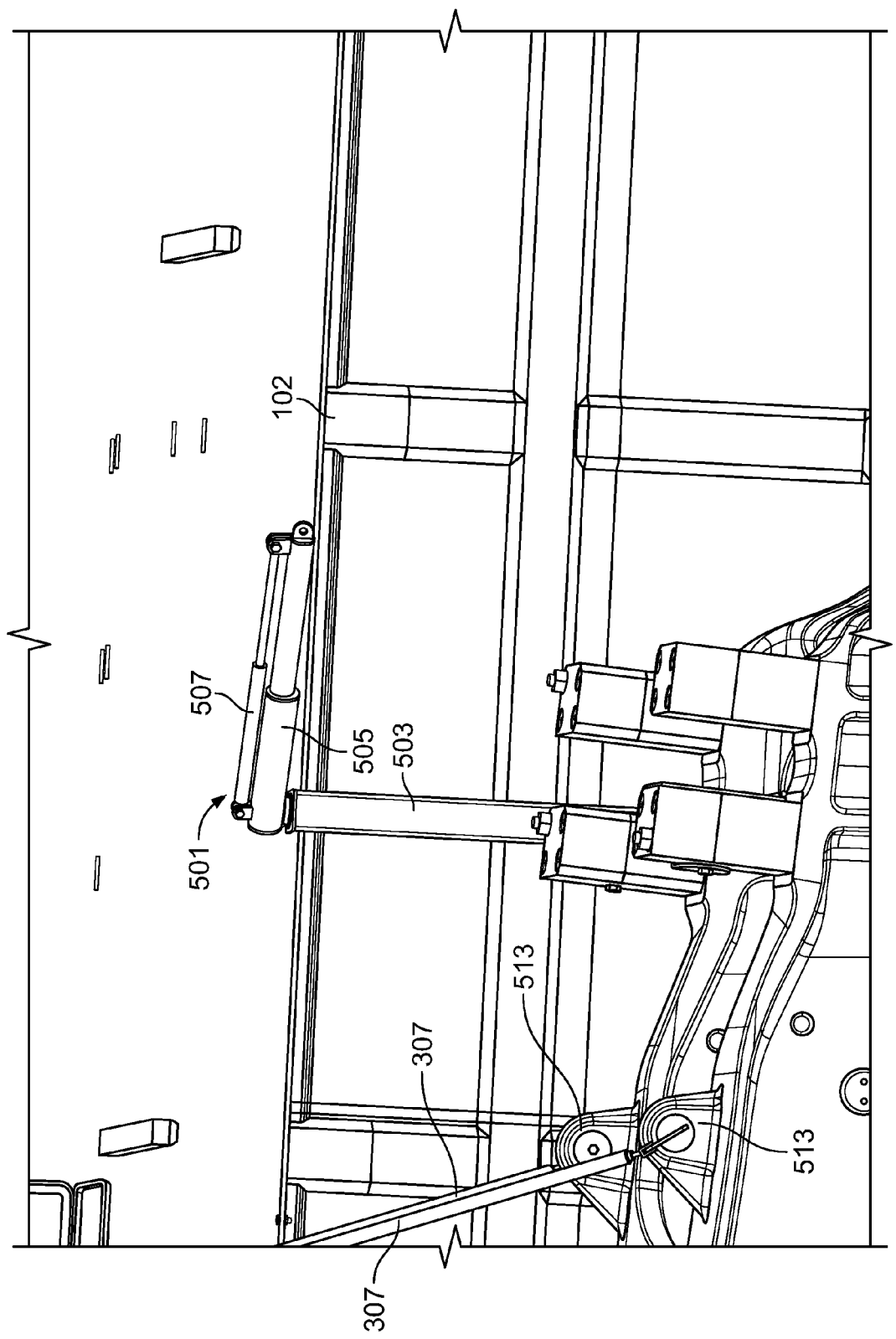
FIG. 6 is a perspective view of a second crane assembly according to an embodiment of the disclosure.
Figure 7:
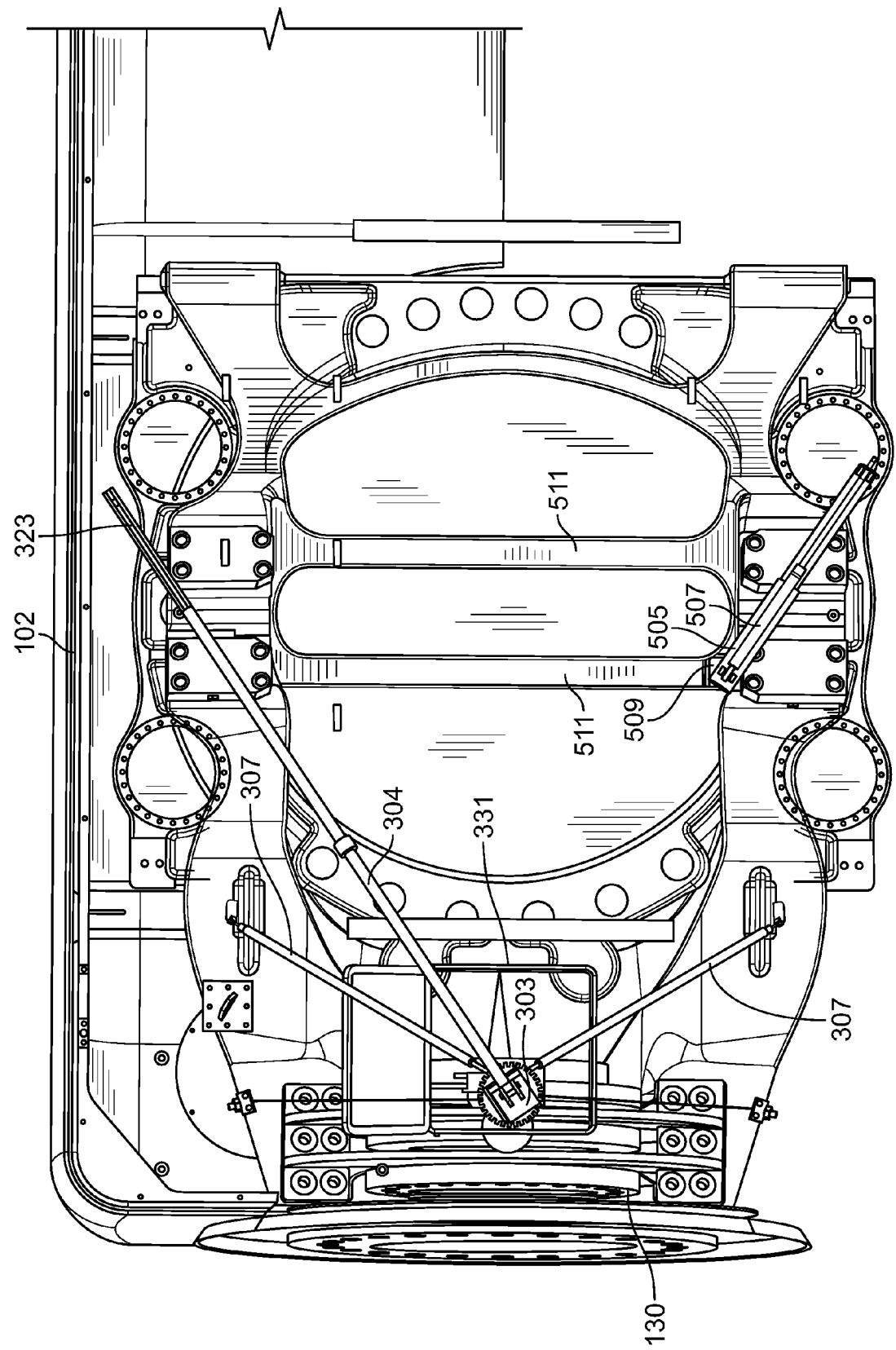
FIG. 7 is a plan view of a nacelle of another exemplary wind turbine configuration having a first crane assembly and second crane assembly installed.
Figure 8:
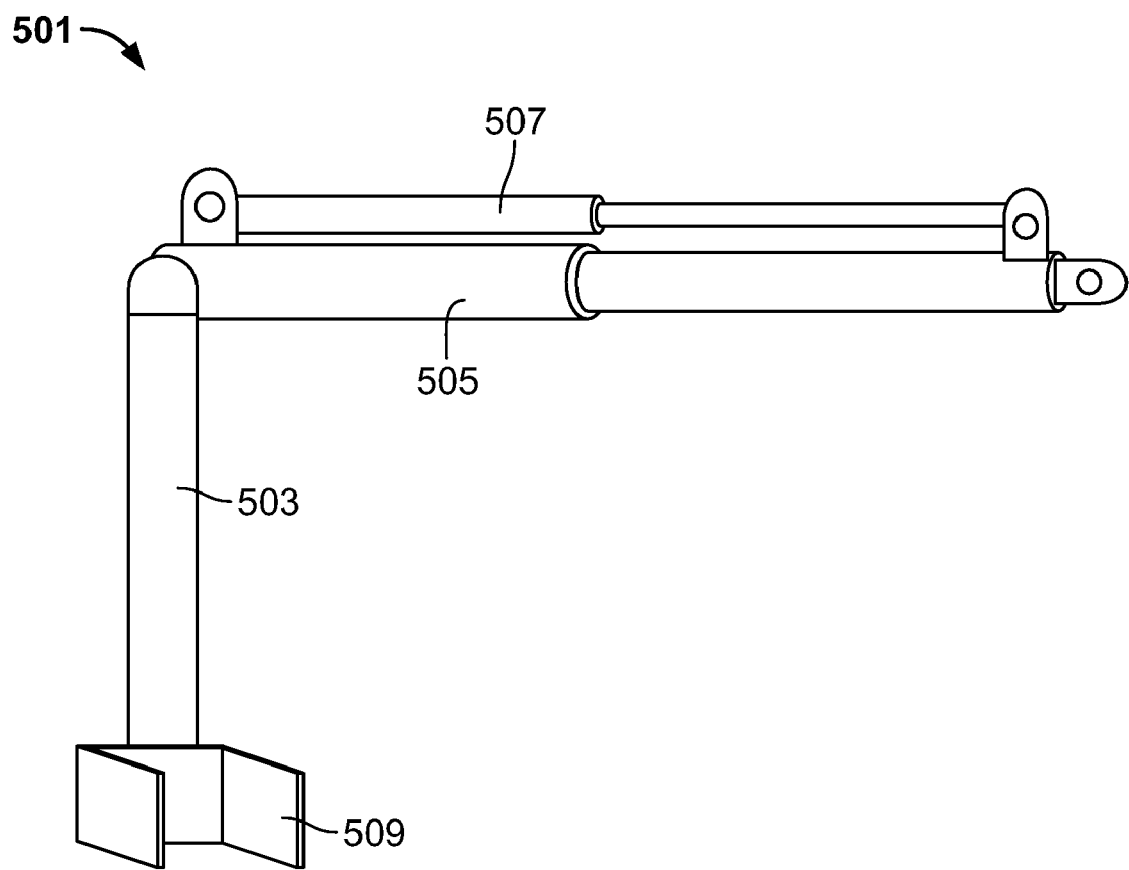
FIG. 8 is a perspective view of a second crane assembly according to an embodiment of the disclosure.
Figure 9:
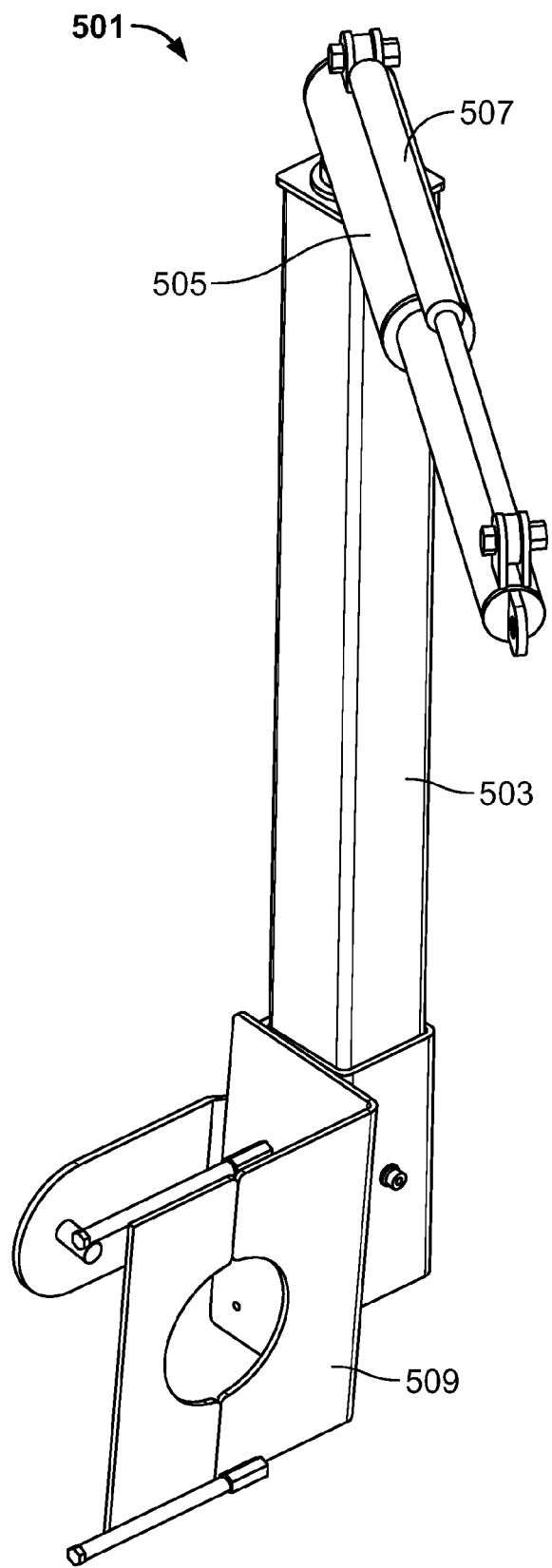
FIG. 9 is a perspective view of a second crane assembly according to another embodiment of the disclosure.

FIG. 5 shows a wind turbine servicing system 500 having a first crane assembly 300 and a second crane assembly 501 according to an embodiment of the present disclosure wherein the components within the nacelle 102 have been removed. As also shown in FIG. 6-9, the second crane assembly 501 includes a post member 503 and extendable swing member 505. The extendable swing member 505 being extendable via a telescoping cylinder or similar structure that permits extension of the swing member 505. The second crane assembly 501 includes a swing member actuator 507 which may drive the extendable swing member 505 in any suitable manner, including hydraulic or electric drive. The swing member 505 is rotatably attached to the post member 503 and allows the swing member 505 to lift, manipulate and move components within the nacelle 102. The second crane assembly 501 is capable of 360° rotation, allowing swing member 505 to lift and swing a load through a full circular path. In addition, the swing member 505 may be operated to provide components to and/or from the primary crane assembly 300. The second crane assembly 500 includes an attachment member 509 (see FIGS. 8 and 9). The attachment member 509 is configured to clamp, engage, interlock or otherwise attach to a component within the nacelle 102. As shown in FIGS. 5 and 7, the second crane assembly 501 is clamped to torque arms 511. However, the present disclosure is not so limited and the second crane assembly 501 may be attached in any suitable location within the nacelle 102 to transfer and position components within the nacelle 102.

Figure 11:
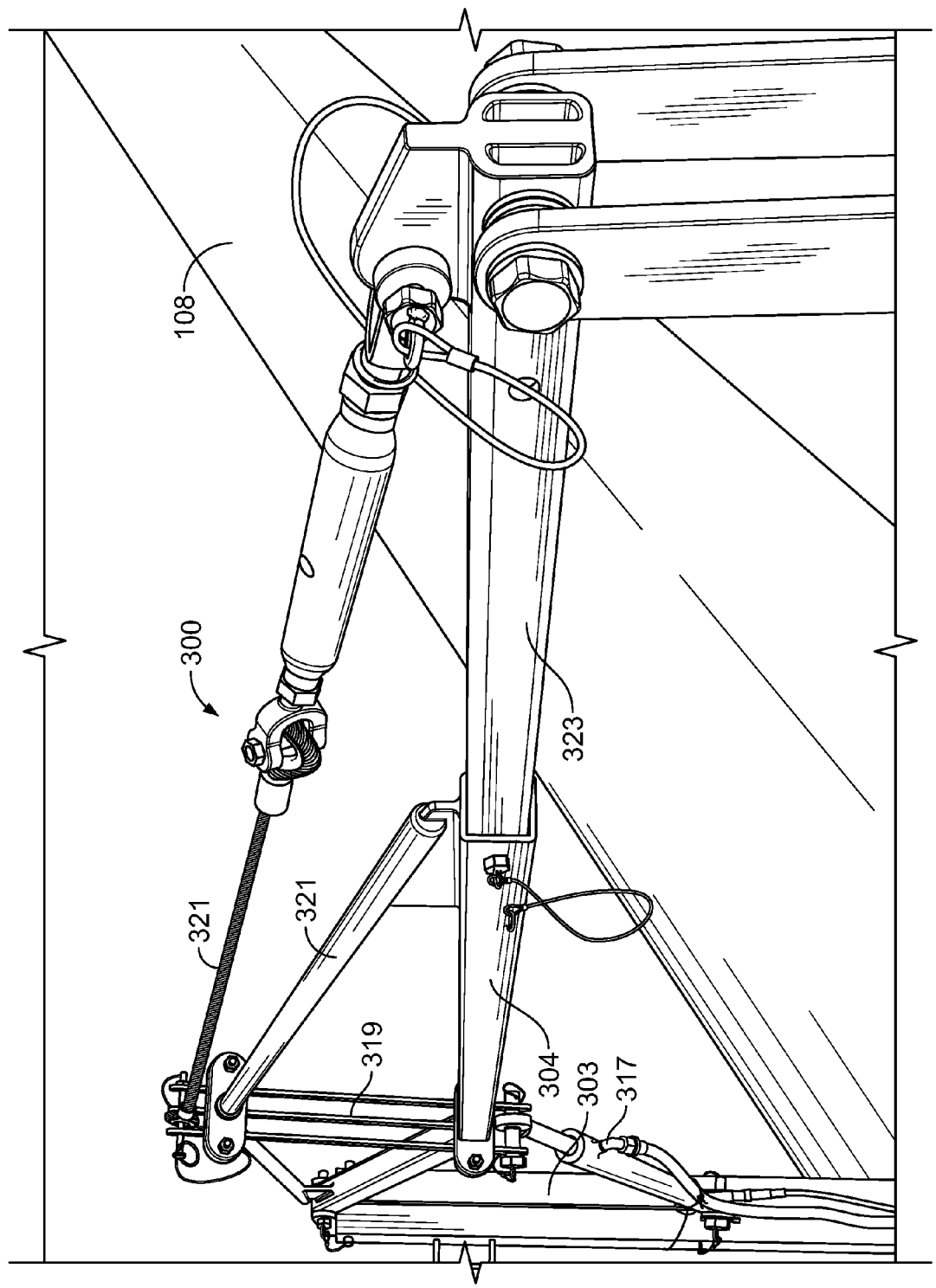
FIG. 11 is a perspective view of a crane assembly in an installed position according to another embodiment of the disclosure.
Figure 12:
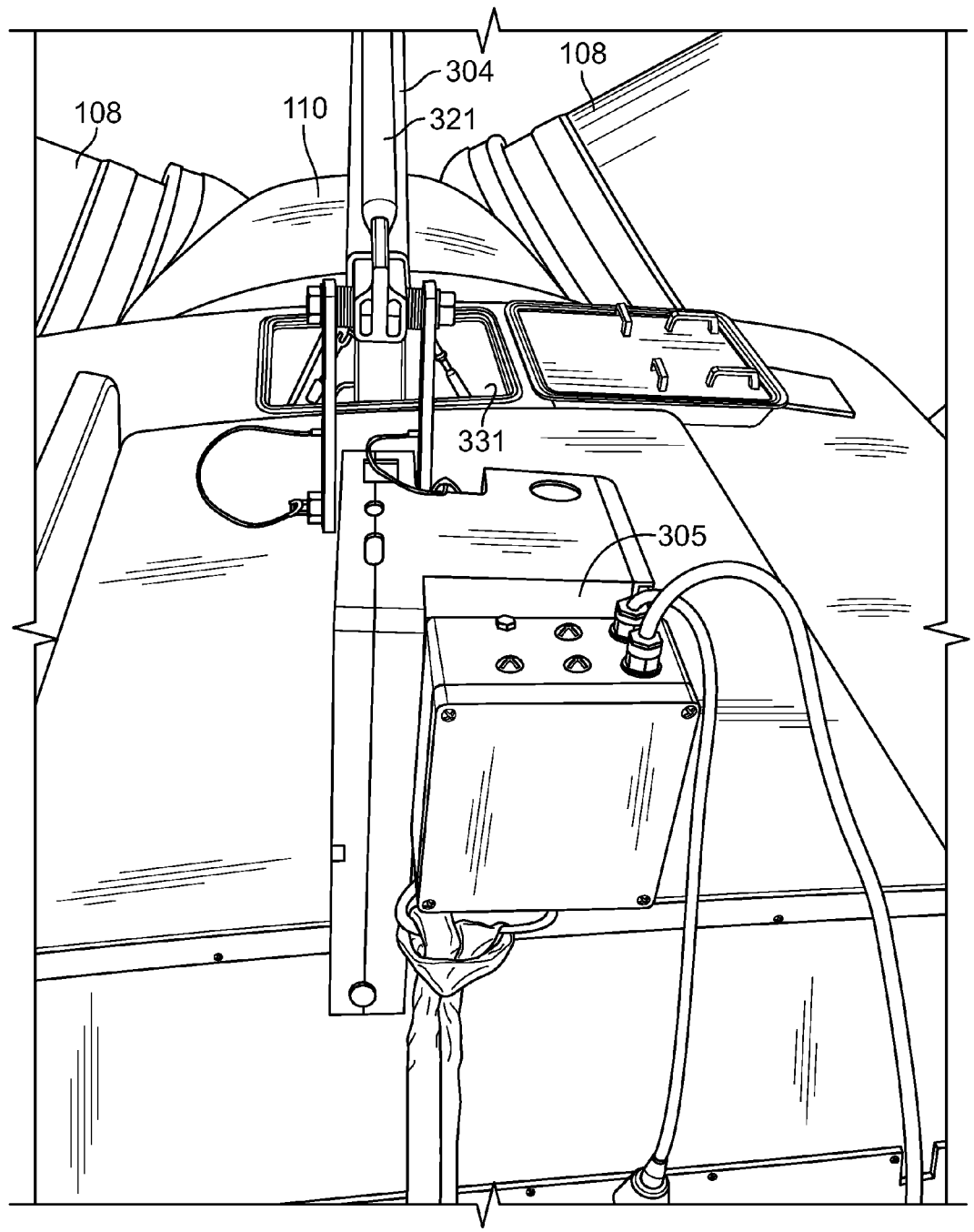
FIG. 12 is a perspective view of a crane assembly in an installed position according to another embodiment of the disclosure.
Figure 13:
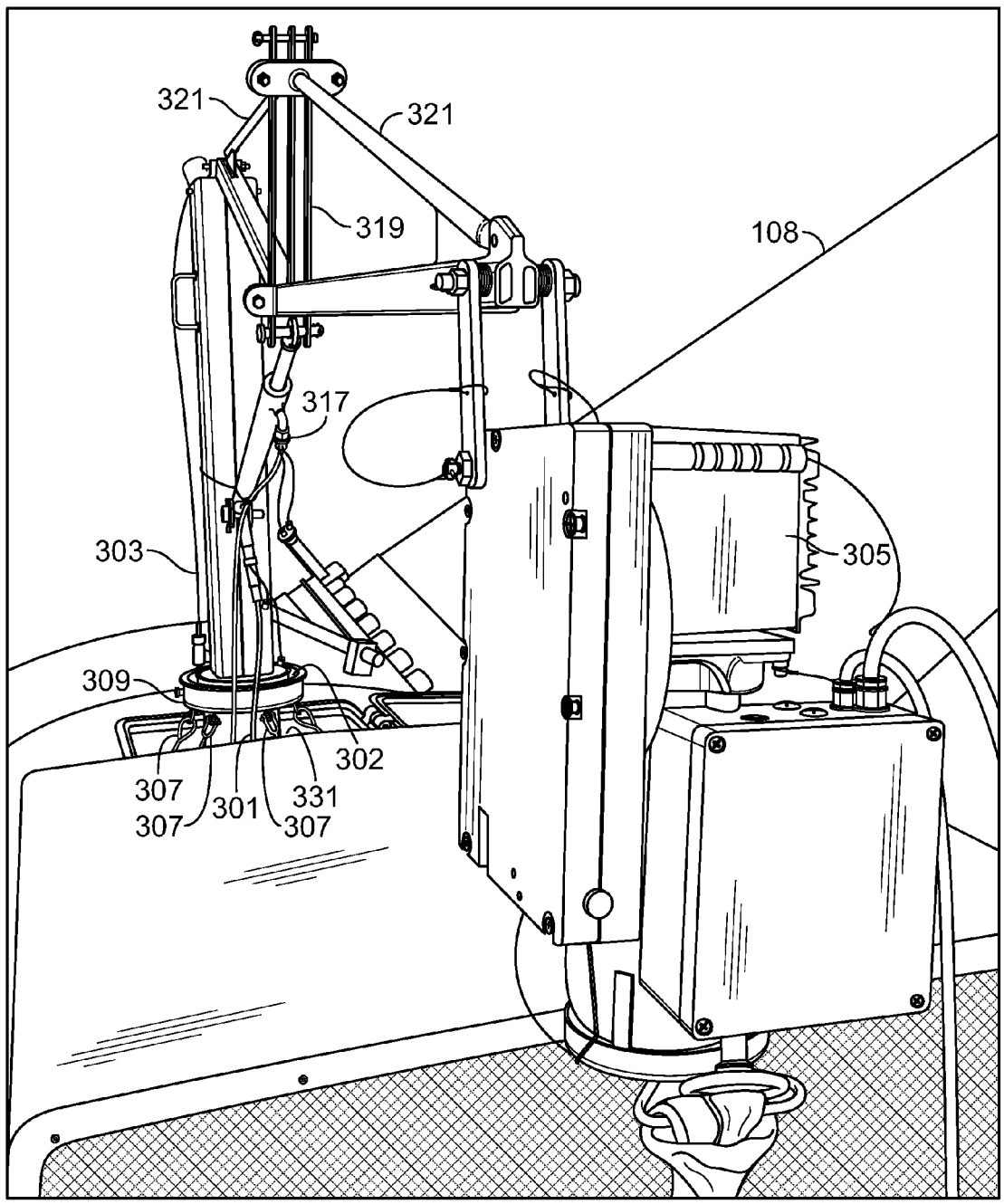
FIG. 13 is a perspective view of a crane assembly in an installed position according to another embodiment of the disclosure.

FIGS. 11-13 show a first crane assembly 300 in an installed position, wherein the first crane assembly 300 extends through a hatch 331. While not limited the particular configuration shown, hatches 331 may include a main hatch near the hub 110, through which the primary crane assembly 300 extends and side hatches along top edges of the nacelle 102. The present disclosure may be utilized with any configuration of hatches 331 that permit the first crane assembly 300 to extend therethrough and to which hatches 331 may access individual components for lifting. The wind turbine servicing system 500 according to the present disclosure permits installation and/or removal of a variety of components. For example, the first crane assembly 300 may lift and install/remove components such as, but not limited to, blade pitch drives 114, yaw drives 124, pitch batteries, brake disks, high speed shaft couplings, oil coolers, oil filters, oil pumps, generator components, such as the generator commutator, or brush holder assembly, gearbox bearings, generator bearings, controller components, cables, and large and/or heavy service tools, such as ladders. In embodiments utilizing larger hatch openings or a removable nacelle panels, the first crane assembly 300 may lift and install/remove components such as, but not limited to, complete generator coolers, complete generator assemblies, and gearbox housings.

Figure 14:
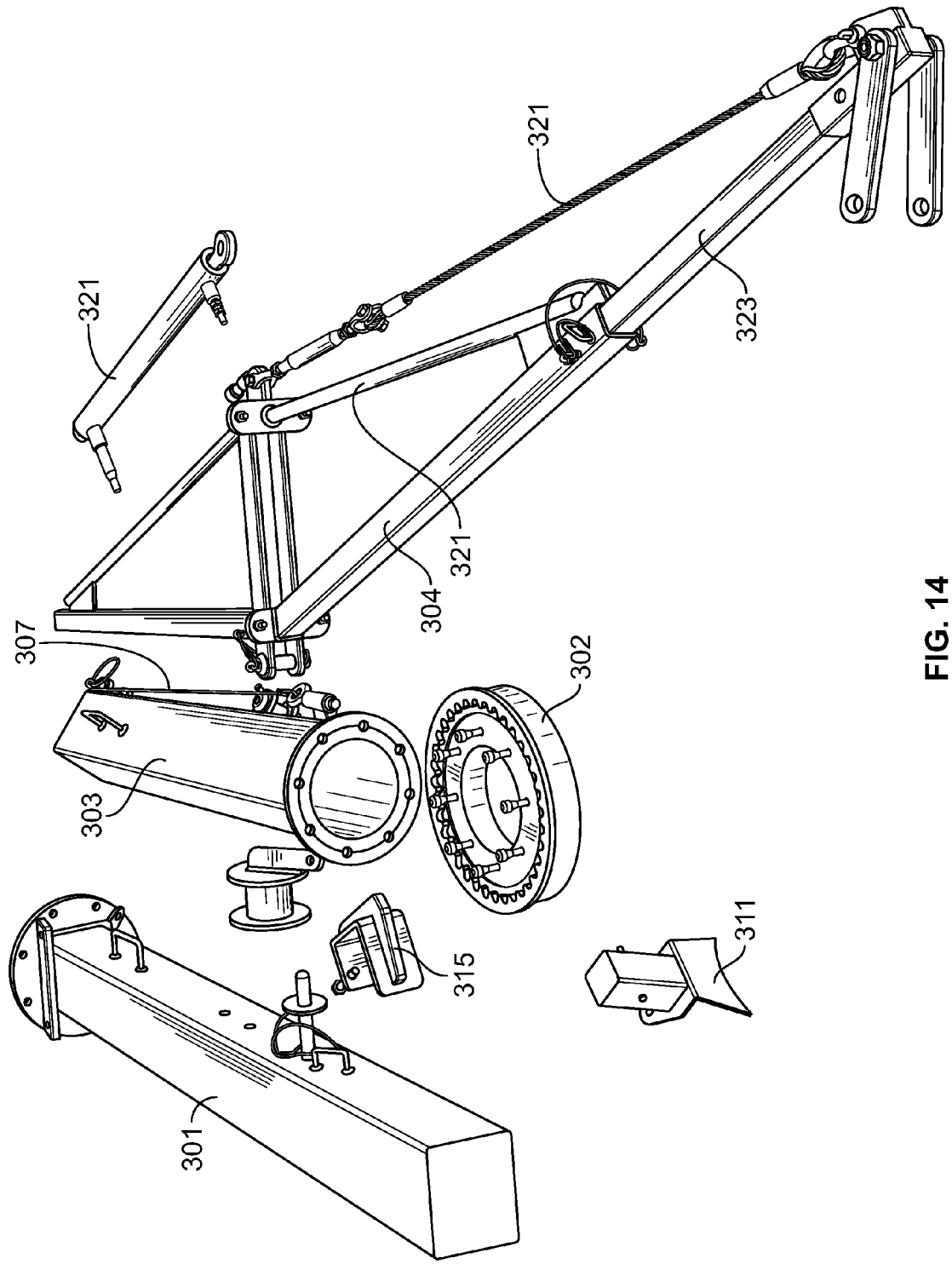
FIG. 14 is a perspective view of a disassembled crane according to another embodiment of the disclosure.

FIG. 14 shows a first crane assembly 300 in an unassembled configuration. The individual components of the first crane assembly 300 and the second crane assembly 501 preferably do not exceed about 30 kg and are sufficiently lightweight and sufficiently small to be handled manually. More specifically, the components of the first crane assembly 300 and second crane assembly 501 would be sufficiently disassemblable to permit the individual components to be carried by hand.

While the disclosure has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A portable crane assembly for servicing a wind turbine comprising:
   a first primary support member and a second primary support member being rotatably attached to one another and having a common axis, the first primary support member extending through a hatch in a nacelle casing of a nacelle of a wind turbine, and the first primary support member being stationary and configured to attach to an attachment plate, the attachment plate being configured to attach to the wind turbine component though the hatch, the second primary support being freely rotatable around the common axis and being capable of rotating 360 degrees with respect to the stationary first primary support member;
   a plurality of movable secondary support members being configured to attach to the first primary support member by a collar, wherein the plurality of movable secondary support members are configured to support and anchor the first and second primary support members, wherein the plurality of movable secondary support members are operable to attach to the wind turbine at an angle by a plurality of secondary support fasteners;
   a boom member being pivotably attached to an end of the second primary support member;
   a plurality of secondary boom supports being configured to attach to the boom member, the plurality of secondary boom supports adapted to support the boom member;
   a boom actuator attached to the second primary support member and the boom member, the boom actuator capable of pivoting the boom member at an angle with respect to the first and second primary support members;
   wherein the portable crane assembly is capable of being assembled through the hatch on the nacelle of the wind turbine; and
   wherein the portable crane assembly is disassemblable into components that can be manually carried to or from the nacelle of the wind turbine.

2. The portable crane assembly of claim 1, wherein the components that can be manually carried are less than about 30 kg.

3. The portable crane assembly of claim 1, wherein the portable crane assembly is capable of lifting components selected from the group consisting of blade pitch drives, yaw drives, pitch batteries, brake disks, high speed shaft couplings, oil coolers, oil filters, oil pumps, generator components, gearbox bearings, generator bearings, controller components, cables, and large and/or heavy service tools.

4. The portable crane assembly of claim 1, wherein the portable crane assembly is capable of lifting components selected from the group consisting of complete generator coolers, complete generator assemblies, and gearbox housings.

5. A wind turbine servicing system comprising:
   a first crane assembly and a second crane assembly arranged and disposed on a wind turbine, the first crane assembly comprising:
   a first primary support member and a second primary support member being rotatably attached to one another and having a common axis, the first primary support member extending through a hatch in a nacelle of the wind turbine, and the first primary support member being stationary and configured to attach to an attachment plate, the attachment plate being configured to attach to the wind turbine component though the hatch, the second primary support member being freely rotatable around the common axis and capable of rotating 360 degrees with respect to the stationary first primary support member of the wind turbine servicing system;
   a plurality of movable secondary support members being configured to attach to the first primary support member by a collar, wherein the plurality of movable secondary support members are configured to support and anchor the first and second primary support members, wherein the plurality of movable secondary support members are operable to attach to the wind turbine at an angle by a plurality of secondary support fasteners;
   a boom member being pivotably attached to an end of the second primary support member;
   a plurality of secondary boom supports being configured to attach to the boom member, the plurality of secondary boom supports adapted to support the boom member;
   a boom actuator attached to the second primary support member and the boom member, the boom actuator capable of pivoting the boom member at an angle with respect to the first and second primary support members;
   wherein the portable crane assembly is capable of being assembled through the hatch on the nacelle; and
   wherein the first and second crane assemblies are disassemblable into components that can be manually carried to or from the nacelle of the wind turbine; and
   the second crane assembly is arranged and disposed to permit manipulation of components within the wind turbine, the second crane assembly comprising:
   a post member and a extendable swing member being rotatably attached to one another, the post member being stationary and configured to attach to an a wind turbine component, the extendable swing member being capable of rotating 360 degrees with respect to the stationary post member of the wind turbine servicing system.

6. The wind turbine servicing system of claim 5, wherein the components that can be manually carried are less than about 30 kg.

7. The wind turbine servicing system of claim 5, wherein the portable crane assembly is capable of lifting components selected from the group consisting of blade pitch drives, yaw drives, pitch batteries, brake disks, high speed shaft couplings, oil coolers, oil filters, oil pumps, generator components, gearbox bearings, generator bearings, controller components, cables, large and/or heavy service tools and combinations thereof.

8. The wind turbine servicing system of claim 5, wherein the portable crane assembly is capable of lifting components selected from the group consisting of complete generator coolers, complete generator assemblies, gearbox housings and combinations thereof.

* * * * *